US005538480A

United States Patent [19]

Torimoto

[11] Patent Number: 5,538,480
[45] Date of Patent: Jul. 23, 1996

[54] HYDRAULIC PRESSURE CONTROL APPARATUS FOR SERVO SYSTEM OF AUTOMATIC TRANSMISSION

[75] Inventor: Yoshifumi Torimoto, Fuji, Japan

[73] Assignee: Jatco Corporation, Fuji, Japan

[21] Appl. No.: 301,576

[22] Filed: Sep. 7, 1994

[30] Foreign Application Priority Data

Sep. 8, 1993 [JP] Japan .................................. 5-247474

[51] Int. Cl.$^6$ ...................................................... F16H 5/60
[52] U.S. Cl. ........................................................ 475/129
[58] Field of Search ...................................... 475/128, 129

[56] References Cited

U.S. PATENT DOCUMENTS 4,679,450  7/1987  Hayakawa et al. .................. 74/752 A Primary Examiner—Dirk Wright
Attorney, Agent, or Firm—Foley & Lardner

[57] ABSTRACT

A pressure control apparatus which controls a hydraulic pressure to be supplied to a hydraulic servo system of an automatic transmission. The pressure control valve includes a shift control valve for controlling the hydraulic pressure to be supplied to the servo system upon receiving the feedback from the servo system and an accumulator disposed between the pressure control valve and the servo system through an orifice. The feedback portions of the pressure control valve have the same area with each other. Therefore, a build-up time of the hydraulic pressure to the servo system is kept constant without being effected by a line pressure and a back pressure of the accumulator.

3 Claims, 2 Drawing Sheets

HYDRAULIC PRESSURE CONTROL APPARATUS FOR SERVO SYSTEM OF AUTOMATIC TRANSMISSION

BACKGROUND OF THE INVENTION

1. Field of the Invention

The present invention generally relates to improvements in a hydraulic control apparatus applied to a hydraulic servo system of an automatic transmission.

2. Description of the Prior Art

Japanese Patent Provisional Publication No. 60-109647 discloses a hydraulic control apparatus for an automatic transmission by which a hydraulic pressure supplied to a hydraulic servo system is controlled. As shown in FIG. 2, a pressure control valve 52 is arranged to implement a hydraulic control operation by using a hydraulic pressure of a hydraulic power source 54 supplied through a shift valve 53. The controlled hydraulic pressure by the pressure control valve 52 is supplied to a hydraulic servo system 56. An operation chamber 50a of an accumulator 50 is fluidly communicated with the pressure control valve 52 through a passage 58 and an orifice 60. The hydraulic pressure of the operation chamber 50a is fedback to the pressure control valve 52 so as to increase the controlled pressure value. On the other hand, the hydraulic pressure of the hydraulic servo system or apparatus 56 is fedback to the pressure control valve 52 so as to decrease the controlled pressure value. Further, the hydraulic pressure of the hydraulic power source 54 is applied to the pressure control valve 52 so as to increase the controlled pressure value.

However, because such a conventional hydraulic pressure control apparatus functions to always apply the hydraulic pressure of the hydraulic source 54 to the pressure control valve 52 in one direction, the characteristic of the accumulator 50 are changed by the change of a line pressure. That is, a build-up time period, in which the hydraulic pressure of the line is generally kept constant, is effected by the characteristics of the accumulator 50. Such a change of the build-up time period is represented by the following equations:

In FIG. 2, when various values are defined as follows:

Q is flow rate passing through an orifice 60, $\alpha$: constant, a: passage cross-sectional area of the orifice 60, $P_S$: hydraulic pressure of the hydraulic servo apparatus 56, P: hydraulic pressure in the operation chamber 50a, $A_1$: area of the operation chamber 50a, F: force applied to accumulator 50, $A_2$: pressure receiving area to a spring side of the pressure control valve 52, $A_3$: source hydraulic pressure working area of the pressure control valve 52, $F_S$: spring force of the pressure control valve 52, $P_L$: line pressure, x: stroke of the accumulator 50, and k: constant, the following equations (1) to (5) are obtained:

$$Q = \alpha a \sqrt{P_S - P} \tag{1}$$

$$PA_1 = F \tag{2}$$

$$P_s(A_2 + A_3) = F_S + PA_2 + P_L A_3 \tag{3}$$

$$Q = A_1 \dot{x} \tag{4}$$

$$F = kx \tag{5}$$

By combining the above equations, the following equation (6) is obtained:

$$\dot{P} = \frac{k\alpha a}{A_1^2} \sqrt{\frac{A_3}{A_2 + A_3}} \sqrt{P_L + \frac{F_S}{A_3} - P} \tag{6}$$

The equation (6) can be deformed as follows:

$$\frac{\partial P}{\sqrt{P' - P}} = \frac{k\alpha a}{A_1^2} \sqrt{\frac{A_3}{A_2 + A_3}} \partial t \tag{7}$$

where $P' = P_L + F_S/A_3$.

When $t=0 \to t$, it is defined that $F = F_1 \to F$ and $P = P_1 \to P$. Next, the integration of the equation (7) is obtained, and by applying the interval [0, t] relative to t and the interval $[F_1, F]$ relative to F to the integration of the equation (7), the following equation (8) is obtained.

$$P = P' - (P' - F_1/A_1)(1 - t/t_0)^2 \tag{8}$$

where $$t_0 = \frac{2A_1^2}{k\alpha a} \sqrt{\frac{A_2 + A_3}{A_3}} \sqrt{P_L + \frac{F_S}{A_3} - \frac{F_1}{A_1}}.$$

Defining that the accumulator 50 finishes the position change from 0 to x when the time T elapsed from the turning-on of the shift valve 53 ($t=0 \to T$), and that at this time $P=P2$, $F=F2$ then, $$P_2 = F_2/A_1.$$

Accordingly, the following equation (9) is obtained from the equation (8).

$$T = \frac{2A_1^2}{k\alpha a} \sqrt{\frac{A_2 + A_3}{A_3}} \left\{ \sqrt{P' - \frac{F_1}{A_1}} - \sqrt{P' - \frac{F_2}{A_1}} \right\} \tag{9}$$

When the volume stroked in the accumulator 50 is V, the following equation (10) is obtained.

$$V = A_1(F_2 - F_1)/k \tag{10}$$

Therefore, the following equation (11) is obtained.

$$T = \frac{2A_1 V}{\alpha a} \sqrt{\frac{A_2 + A_3}{A_3}} \frac{\sqrt{P' - F_1/A_1} - \sqrt{P' - F_2/A_1}}{F_2 - F_1} \tag{11}$$

As is clear from the equation (11), the time T is varied according to the change of P'. Since P' changes according to the variation of the line pressure $P_L$, the time T changes according to the line pressure $P_L$. This indicates that the delay time by the conventional pressure control apparatus is effected by the line pressure $P_L$.

SUMMARY OF THE INVENTION

It is an object of the present invention to provide a hydraulic pressure control apparatus by which a build-up time period of hydraulic pressure for a servo system of an automatic transmission is kept constant without being effected by a line pressure and a back pressure at an accumulator.

A hydraulic pressure control apparatus according to the present invention is for a servo system of an automatic transmission. The hydraulic pressure control apparatus controls a line pressure from a hydraulic power source and supplies the controlled hydraulic pressure to a hydraulic servo system. The hydraulic pressure control apparatus comprises a pressure control valve which controls the line pressure from the hydraulic power source and supplies to the hydraulic servo system. The pressure control valve has a first pressure receiving portion and a second pressure receiving portion opposite to the first pressure receiving portion. An area of the first pressure receiving portion is the same as that of the second pressure receiving portion. The hydraulic pressure supplied to the hydraulic servo system from the pressure control valve is feedbacked to the second pressure receiving portion. A passage connects the pressure control valve and the hydraulic servo system. An accumulator is connected with the passage. The hydraulic pressure at the accumulator is feedbacked to the first pressure receiving portion. An orifice is disposed between the passage and the accumulator.

DETAILED DESCRIPTION OF THE INVENTION

Figure 1:
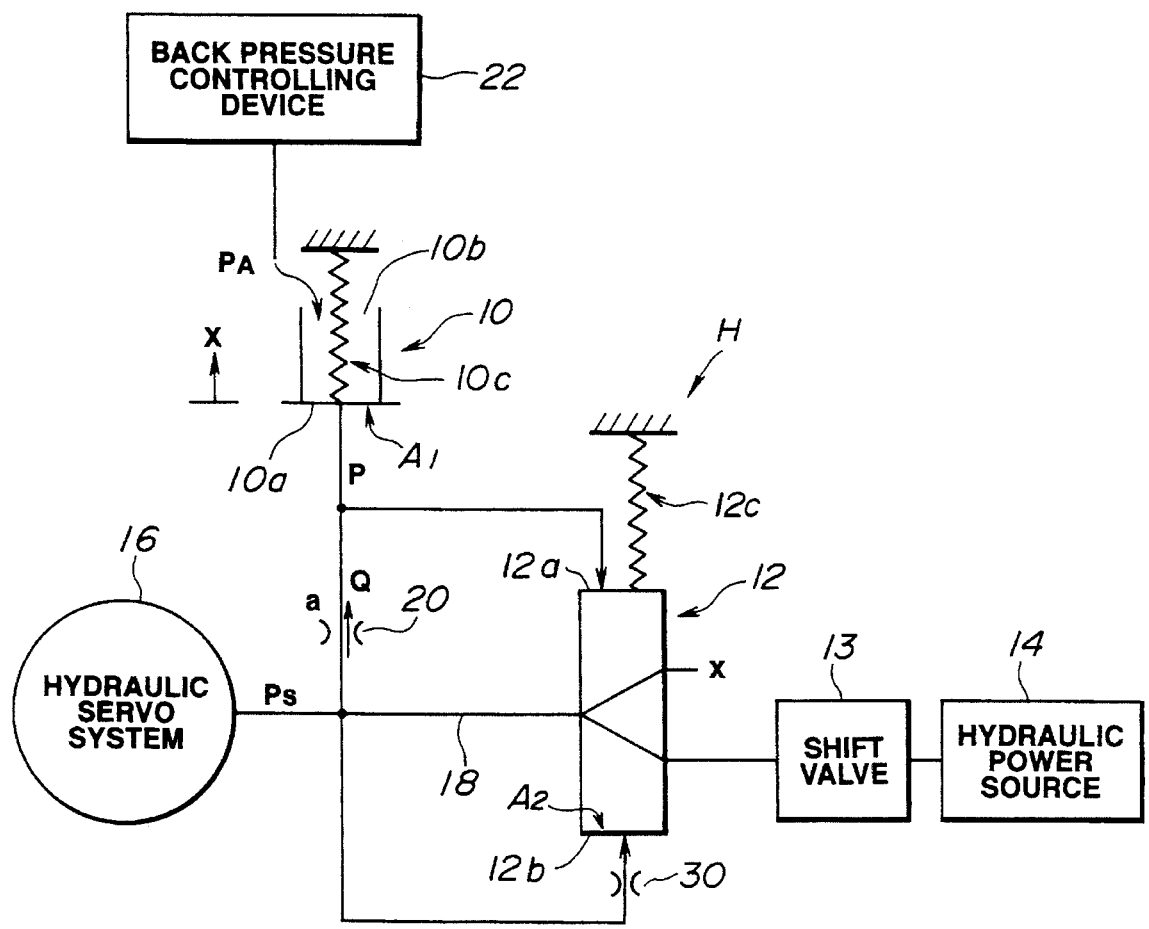
FIG. 1 is a schematic diagram of a hydraulic control apparatus for an automatic transmission according to the present invention.
Figure 2:
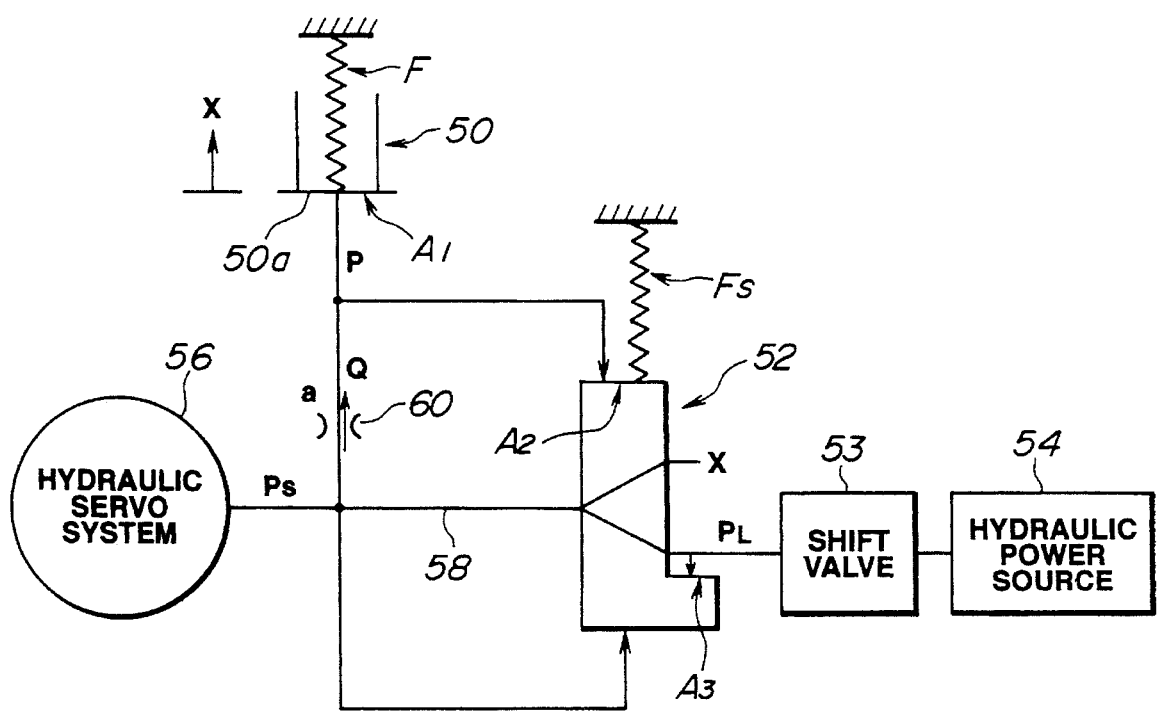
FIG. 2 is a schematic diagram of a conventional hydraulic control apparatus for an automatic transmission.

Referring now to FIG. 1, there is shown an embodiment of a hydraulic control apparatus H for a servo system of an automatic transmission according to the present invention.

As shown in FIG. 1, the hydraulic control apparatus H comprises an accumulator 10 and a pressure control valve 12. The pressure control valve 12 is arranged to control the hydraulic pressure from a hydraulic power source 14 through a shift valve (selector valve) 13 and supply the controlled hydraulic pressure to a hydraulic servo system 16. A passage 18 connects the pressure control valve 12 and a hydraulic servo system 16. An operation chamber 10a of the accumulator 10 is connected to the passage 18 through an orifice 20. The hydraulic pressure P from the operation chamber 10a is fedback to the pressure control valve 12 so as to increase the controlled value of the pressure control valve 12. The hydraulic pressure $P_S$ from the hydraulic servo system 16 is fedback to the pressure control valve 12 through an orifice 30 so as to decrease the controlled value of the pressure control valve 12. The pressure control valve 12 has first and second pressure operated portions 12a and 12b at its both ends. The hydraulic pressure P from the operation chamber 10a of the accumulator 10 is fedback to the first pressure receiving portion 12a. A spring force $F_S$ of the spring 12c is applied to the first pressure receiving portion 12a. The hydraulic pressure $P_S$ from the hydraulic servo system 16 is fedback to the second pressure receiving portion 12b. The area of the first pressure receiving portion 12a is arranged to be the same as that of the second pressure receiving portion 12b. The accumulator 10 is constituted by the operation chamber 10a and a back pressure chamber 10b opposite to the operation chamber 10a in an accumulator body (no numeral). The operation chamber 10a is arranged to stroke from 0 position to x position according to the force $P.A_1$ biasing to the force F of a spring 10c of the back pressure chamber 10b and a force $P_A.A_1$ controlled by a back pressure controlling device 22. The back pressure controlling device 22 is connected with the back pressure chamber 10b and adjustably controls the hydraulic pressure $P_A$ in the back pressure chamber 10b at a desired value. The back pressure controlling device 22 is a common use type and is constituted by a duty solenoid (not shown) and a control valve (not shown) which controls hydraulic pressure according to the output from the duty solenoid.

The manner of operation of the thus arranged pressure control apparatus for the automatic transmission according to the present invention will be discussed hereinafter.

When the shift valve 13 is switched so as to fluidly connect the hydraulic power source 14 and the pressure control valve 12, that is, when the line pressure is applied to the control valve 12, the pressure control valve 12 starts to control and supply the hydraulic pressure $P_S$ to be supplied to the hydraulic servo system 16. Simultaneously, the hydraulic pressure $P_S$ is gradually increased due to the function of the accumulator 10. That is, the accumulator 10 gradually changes the position of the operation chamber 10a while the pressure P in the operation chamber 10a balances with the sum of a spring force F and a force $P_A A_1$ generated by the back pressure control device 22. During this period, the pressure control valve 12 controls the hydraulic pressure $P_S$ according to the two feedback hydraulic pressures, with respective to the first and the second pressure receiving portions 12a and 12b of the pressure control valve 12, so as to slightly and linearly increase the hydraulic pressure $P_S$. When the position of the operation chamber 10a has just fully stroked from 0 to x, the hydraulic pressure $P_S$ is sharply increased to a line pressure from the hydraulic power source 14. Such an operational characteristic is represented as follows:

As shown in FIG. 1, when various values are defined as follows:

Q: flow rate passing through the orifice 20,

α: constant, a: passage cross-sectional area of the orifice 20, $P_S$: hydraulic pressure of the hydraulic servo system 16, P: hydraulic pressure in the operation chamber 10a, $A_1$: area of the operation chamber 10a, F: force applied to the accumulator 10, $A_2$: pressure receiving area of both sides of the pressure control valve 12, $F_S$: spring force of the spring 12c in the pressure control valve 12

$P_A$: back pressure of the accumulator 10, x: stroke of the accumulator 10, and k: constant, the following equations are obtained:

$$Q = \alpha a \sqrt{P_S - P} \qquad (12)$$

$$PA_1 = F + P_A A_1 \qquad (13)$$

$$P_S A_2 = F_S + PA_2 \qquad (14)$$

$$Q = A_1 \dot{x} \qquad (15)$$

$$F = k\dot{x} \qquad (16)$$

By combining the equations (12) to (16), the following equation (17) is obtained.

$$\dot{F} = \frac{k\alpha a}{A_1} \sqrt{\frac{F_S}{A_2}} \quad (17)$$

The equation (17) can be deformed as follows:

$$\partial F = \frac{k\alpha a}{A_1} \sqrt{\frac{F_S}{A_2}} \, \partial t \quad (18)$$

When $t=0 \to t$, it is defined that $F=F_1 \to F$ and $P=P_1 \to P$. Next, the integration of the equation (18) is obtained upon applying the interval [0, t] relative to t and the interval $[F_1, F]$ relative to F to the integration of the equation (18).

$$F = F_1(1 + t/t_0) \quad (18)$$

where $$t_0 = \frac{A_1 F_1}{k\alpha a} \sqrt{\frac{A_2}{F_S}} \, . \quad 20$$

By substituting the equations (13) and (14) to the equation (18), the following equation (19) is obtained.

$$P_S = P_A + \frac{F_S}{A_2} + \frac{F_1}{A_1}\left(1 + \frac{t}{t_0}\right) \quad (19)$$

Defining that the accumulator 10 finishes the position change from 0 to x when the time T elapsed from the turning-on of the shift valve 13 ($t=0 \to T$) and at this time $F=F_2$, the following equation (20) is obtained.

$$T = \frac{A_1 \sqrt{A_2}}{k\alpha a} \frac{F_2 - F_1}{\sqrt{F_S}} \quad (20)$$

When the volume stroked in the accumulator is V, the following equation (10) is obtained.

$$V = A_1 \frac{F_2 - F_1}{k} \quad (21)$$

Therefore, the following equation (22) is obtained.

$$T = \frac{1}{\alpha a} \sqrt{\frac{A_2}{F_S}} \, V \quad (22)$$

As is clear from the equation (22), it will be understood that the time T is not varied by the line pressure $P_L$ and the back pressure $P_A$ of the accumulator 20, and is kept constant.

What is claimed is:

1. A hydraulic pressure control apparatus for a hydraulic servo system of an automatic transmission, the hydraulic pressure control apparatus controlling a line pressure from a hydraulic power source and supplying a controlled hydraulic pressure to a hydraulic servo system, the hydraulic pressure control apparatus comprising:

a pressure control valve controlling the line pressure from the hydraulic power source and supplying the hydraulic pressure to the hydraulic servo system, the pressure control valve having a first pressure receiving portion and a second pressure receiving portion opposite to the first pressure receiving portion, an area of the first pressure receiving portion being substantially equal to an area of the second pressure receiving portion, the hydraulic pressure supplied to the hydraulic servo system from the pressure control valve being fed back to the second pressure receiving portion;

a passage connecting the pressure control valve and the hydraulic servo system;

an accumulator connected with the passage, a hydraulic pressure at the accumulator being fed back to the first pressure receiving portion;

an orifice disposed between said passage and said accumulator; and a back pressure controlling device which is connected to the accumulator.

2. A hydraulic pressure control apparatus for a hydraulic servo system of an automatic transmission, the hydraulic pressure control apparatus controlling a line pressure from a hydraulic power source and supplying a controlled hydraulic pressure to a hydraulic servo system, the hydraulic pressure control apparatus comprising:

a pressure control valve controlling the line pressure from the hydraulic power source and supplying the hydraulic pressure to the hydraulic servo system, the pressure control valve having a first pressure receiving portion and a second pressure receiving portion opposite to the first pressure receiving portion, an area of the first pressure receiving portion being substantially equal to an area of the second pressure receiving portion, the hydraulic pressure supplied to the hydraulic servo system from the pressure control valve being fed back to the second pressure receiving portion;

a passage connecting the pressure control valve and the hydraulic servo system;

an accumulator connected with the passage, a hydraulic pressure at the accumulator being fed back to the first pressure receiving portion;

an orifice disposed between said passage and said accumulator; and a second orifice disposed in the passage through which the hydraulic pressure at the hydraulic servo system is fed back.

3. A hydraulic pressure control apparatus for a hydraulic servo system of an automatic transmission, the hydraulic pressure control apparatus controlling a line pressure from a hydraulic power source and supplying the controlled hydraulic pressure to a hydraulic servo system, the hydraulic pressure control apparatus comprising:

a pressure control valve controlling the line pressure from the hydraulic power source and supplying the hydraulic pressure to the hydraulic servo system, the pressure control valve having a first pressure receiving portion and a second pressure receiving portion that is opposite to the first pressure receiving portion, the hydraulic pressure supplied to the hydraulic servo system from the pressure control valve being fed back to the second pressure receiving portion;

a passage connecting the pressure control valve and the hydraulic servo system;

an accumulator connected with the passage, a hydraulic pressure at the accumulator being fed back to the first pressure receiving portion;

an orifice disposed between the passage and the accumulator;

a back pressure controlling device connected to the accumulator; and a second orifice disposed in the passage through which the hydraulic pressure at the hydraulic servo system is fed back.

\* \* \* \* \*